(12) United States Patent
Van Diepen et al.

(10) Patent No.: US 12,510,574 B2
(45) Date of Patent: Dec. 30, 2025

(54) READOUT OF A QUANTUM STATE IN AN ARRAY OF QUANTUM DOTS

(71) Applicant: Technische Universiteit Delft, Delft (NL)

(72) Inventors: Cornelis Jacobus Van Diepen, Delft (NL); Tzu-Kan Hsiao, Delft (NL)

(73) Assignee: Technische Universiteit Delft, Delft (NL)

( * ) Notice: Subject to any disclaimer, the term of this patent is extended or adjusted under 35 U.S.C. 154(b) by 761 days.

(21) Appl. No.: 17/757,798

(22) PCT Filed: Dec. 24, 2020

(86) PCT No.: PCT/NL2020/050821
§ 371 (c)(1),
(2) Date: Jun. 21, 2022

(87) PCT Pub. No.: WO2021/133173
PCT Pub. Date: Jul. 1, 2021

(65) Prior Publication Data
US 2022/0351063 A1    Nov. 3, 2022

(30) Foreign Application Priority Data
Dec. 24, 2019   (NL) ...................................... 2024580

(51) Int. Cl.
*H10N 60/10*     (2023.01)
*G01R 27/02*     (2006.01)
(Continued)

(52) U.S. Cl.
CPC ............. *G01R 27/02* (2013.01); *G06N 10/20* (2022.01); *G06N 10/40* (2022.01); *H10N 60/10* (2023.02)

(58) Field of Classification Search
CPC ........ G01R 27/02; G06N 10/20; G06N 10/40; H10N 60/10
See application file for complete search history.

(56) References Cited

U.S. PATENT DOCUMENTS

| | | | |
|---|---|---|---|
| 6,580,102 B2 * | 6/2003 | Ivanov | G06N 10/40 |
| | | | 977/960 |
| 6,605,822 B1 * | 8/2003 | Blais | H10N 69/00 |
| | | | 977/933 |

(Continued)

OTHER PUBLICATIONS

International Search Report and Written Opinion for corresponding International application No. PCT/NL2020/050821; dated Mar. 23, 2021 (16 pages).

(Continued)

*Primary Examiner* — Jorge A Casanova
(74) *Attorney, Agent, or Firm* — MENDELSOHN DUNLEAVY P.C.; Kevin J. Dunleavy; Steve Mendelsohn

(57) ABSTRACT

Methods and systems are described for readout of one or more spin states associated with one or more quantum dots in an array of quantum dots, wherein the method comprises: configuring or providing one or more read-out paths of connected quantum dots in the array of quantum dots, the quantum dots of at least one of the one or more read-out paths being configured close to a charge transition point such that a charge transition in one or more first quantum dots at a first end of the tuned read-out path induces a charge transition in one or more second quantum dots at a second end of the tuned read-out path, the second end being connected to a charge detector; configuring one or more quantum dots of the quantum dot array into a spin-to-charge conversion system connected to the first end of the tuned read-out path, the charge convention system including at least two connected quantum dots hosting a spin state or a quantum dot hosting a spin state connected to a reservoir;

(Continued)

and, obtaining information about the spin state in the spin-to-charge system, the obtaining information including the charge detector measuring a charge transition in the one or more second quantum dots at a second end of the tuned read-out path.

18 Claims, 9 Drawing Sheets

(51) Int. Cl.
*G06N 10/20* (2022.01)
*G06N 10/40* (2022.01)

(56) References Cited

U.S. PATENT DOCUMENTS

| | | | | |
|---|---|---|---|---|
| 6,987,282 | B2* | 1/2006 | Amin | B82Y 10/00 977/933 |
| 7,332,738 | B2* | 2/2008 | Blais | G06N 10/40 708/190 |
| 7,830,695 | B1* | 11/2010 | Moon | G11C 11/44 257/14 |
| 10,599,990 | B2* | 3/2020 | Leek | G06N 10/40 |
| 11,516,190 | B1* | 11/2022 | McCarty | H04L 9/0858 |
| 11,611,032 | B2* | 3/2023 | Leipold | G06N 10/40 |
| 2005/0045872 | A1* | 3/2005 | Newns | B82Y 10/00 257/31 |
| 2006/0260016 | A1 | 11/2006 | Greentree et al. | |
| 2008/0215850 | A1* | 9/2008 | Berkley | G06N 10/80 712/1 |
| 2017/0206461 | A1* | 7/2017 | Friesen | G06F 15/82 |
| 2022/0269973 | A1* | 8/2022 | Kelly | G06N 10/20 |
| 2022/0307997 | A1* | 9/2022 | Meijer | G01R 33/032 |
| 2022/0414516 | A1* | 12/2022 | Künne | H10N 69/00 |
| 2023/0274177 | A1* | 8/2023 | Endres | G06N 10/70 702/186 |
| 2024/0119326 | A1* | 4/2024 | Satzinger | G06F 15/16 |
| 2024/0289289 | A1* | 8/2024 | Fang | G06F 13/36 |
| 2025/0044250 | A1* | 2/2025 | Chatterjee | G01N 27/22 |

OTHER PUBLICATIONS

International Preliminary Report on Patentability for corresponding International application No. PCT/NL2020/050821; dated Mar. 9, 2022 (15 pages).
Aasen, David, et al. "Milestones toward Majorana-based quantum computing." Physical Review X 6.3 Article 031016 (2016): 1-28.
Elzerman, J. M., et al. "Single-shot read-out of an individual electron spin in a quantum dot." Nature 430.6998 (2004): 431-435.
Jang, Wonjin, et al. "High-visibility single-shot readout of singlet-triplet qubits in a micromagnet-integrated quadruple quantum dot array." Arxiv.org, Cornell University Library (2019): 1-32.
Li, Ruoyu, et al. "A Crossbar Network for Silicon Quantum Dot Qubits." Arxiv.org, arXiv:1711.03807 [cond-mat.mes-hall] (2017): 1-24.
Mills, A. R., et al. "Shuttling a single charge across a one-dimensional array of silicon quantum dots." Nature Communications 10.1 Article 1063 (2019): 1-6.
Mukhopadhyay, Uditendu, et al. "A 2×2 quantum dot array with controllable inter-dot tunnel couplings." Arxiv.org, arXiv: 1802.05446v2 [cond-mat.mes-hall] (2018): 1-5.
Yoneda, Jun, et al. "A quantum-dot spin qubit with coherence limited by charge noise and fidelity higher than 99.9%." Nature Nanotechnology 13.2 (2018): 102-106.
Zheng, Guoji, et al. "Rapid gate-based spin read-out in silicon using an on-chip resonator." Nature Nanotechnology 14.8 (2019): 742-746.

* cited by examiner

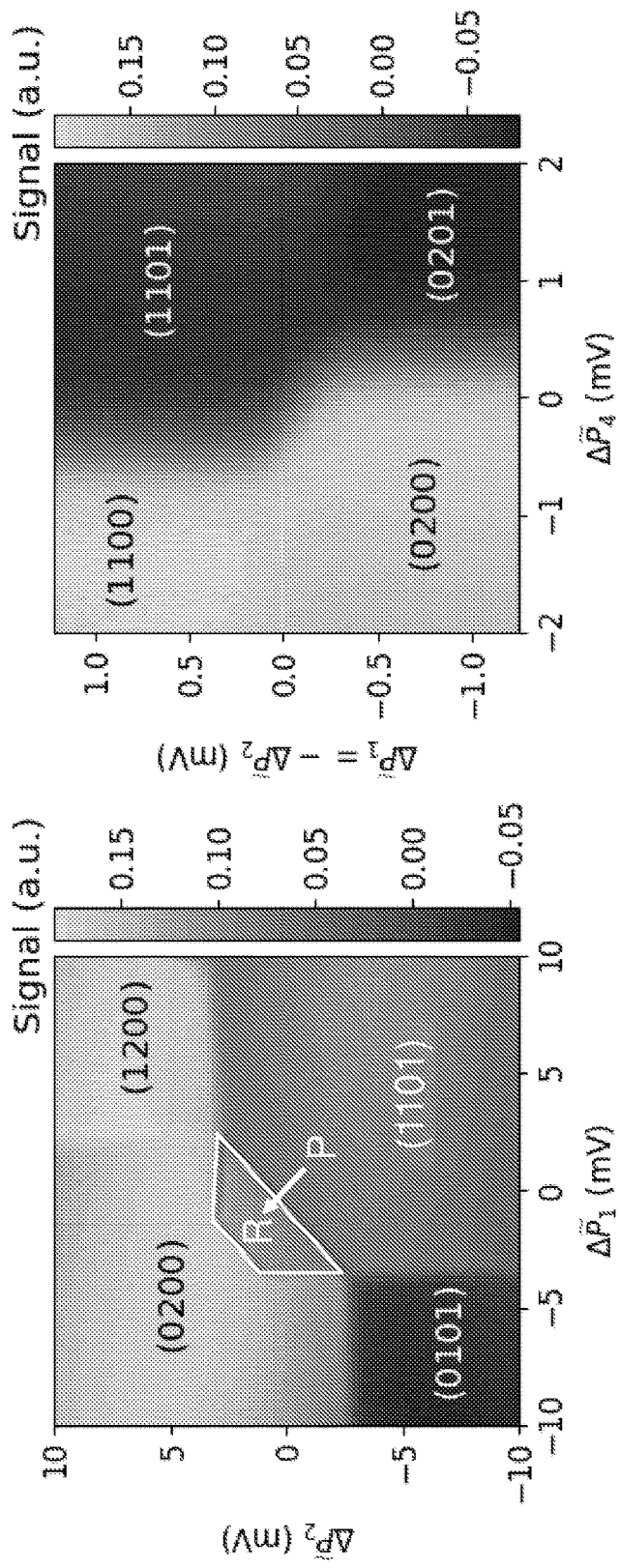
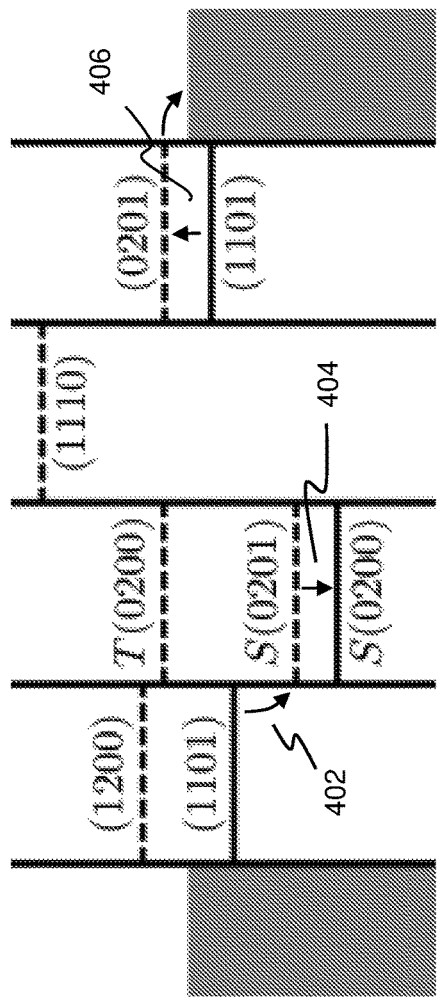
FIG. 4A
FIG. 4B
FIG. 4C

READOUT OF A QUANTUM STATE IN AN ARRAY OF QUANTUM DOTS

FIELD OF THE INVENTION

The invention relates to a readout of a quantum state in an array of quantum dots, and, in particular, though not exclusively, to methods and systems for readout of a quantum state, such as a spin state, in an array of quantum dots and a computer program product for executing such methods.

BACKGROUND OF THE INVENTION

Spin-qubits in gate-defined quantum dots are considered a promising platform for quantum computation and simulation. An important advantage is the small footprint of quantum dots, since the dot pitch is about a hundred nanometre, which enables dense packing, allowing a hundred million quantum dots to fit on only a square millimetre. For operation as a quantum computer, a system has to obey a set of requirements, among which a universal set of quantum gates and qubit readout. An example of a readout structure is described in 2006/0260016, which describes a double quantum dot system coupled via a quantum dot to a single electron transistor (SET) which acts as charge sensor. In the recent years, high-fidelity single-qubit and two-qubit control of spin-qubits have been demonstrated, and high-fidelity readout has been achieved as e.g. described by Yoneda, J. et al. A *Quantum-dot spin qubit with coherence limited by charge noise and fidelity higher than* 99.9%. Nature Nanotechnology 13, 102-106 (2018).

However, spin-qubit results achieved so far focused one or two qubit systems, hence the challenges of operation and readout of large and densely packed spin-qubit arrays are yet to be faced. An obstacle for readout is that the commonly used technique of charge sensing only allows to sense locally, thus limiting readout to quantum dots near the sensor. The placement of charge sensors near all quantum dots in the qubit array will be detrimental for qubit connectivity and packing density, since charge sensors require a connection to an area-consuming reservoir.

Proposals for quantum processors based on gate-defined quantum dots are known, but suggest dispersive-gate sensing as method to readout two-dimensional arrays of spin-qubits, see for example Zheng, G. et al. *Rapid gate-based spin read-out in silicon using an on-chip resonator*. Nature Nanotechnology 14, 742-746 (2019), but the lower signal-to-noise ratio has hindered reaching the fidelity required for quantum error correction. Alternative schemes to readout large arrays utilize state transfer, for example by shuttling electrons as described by Mills, A. R. et al. *Shuttling a single charge across a one-dimensional array of silicon quantum dots*. Nature Communications 10, 1063 (2019). Other suggestions include qubit operations or via quantum teleportation utilizing entanglement. Such solutions however are technological difficult to realize or impose certain constraints. For example, state transfer imposes additional constraints: an empty array of dots for shuttling, high fidelity qubit operations, or a high fidelity entangled state for teleportation.

Hence, from the above it follows there is a need in the art for improved schemes for readout of a quantum state in a quantum dot that is part of a quantum dot array. In particular, there is a need in the art for improved systems and method for fast, high-fidelity and scalable readout schemes for a quantum state in a quantum dot that is part of a quantum dot array.

SUMMARY OF THE INVENTION

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Additionally, the Instructions may be executed by any type of processors, including but not limited to one or more digital signal processors (DSPs), general purpose microprocessors, application specific integrated circuits (ASICs), field programmable logic arrays (FP-GAs), or other equivalent integrated or discrete logic circuitry.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In this application, methods and systems for readout of a spin state or a parity state associated in an array of quantum-dots are described. The readout methods may include the formation of one or more read-out paths of tunnel junctions connecting quantum dots in an array of quantum dots. The readout may be achieved by tuning quantum dots in one or more read-out paths or read-out regions close to a charge transition state. This way, a charge transition in a quantum state-to-charge conversion system may trigger a cascade of charge transitions in the read-out path or read-out region, including one or more charge transitions in one or multiple parts of the read-out region that is close to one or multiple charge sensors.

The readout scheme described with reference to the embodiments provide substantial advantages over prior art readout schemes, including high-fidelity readout of a quantum state (e.g. a quantum state of a qubit) in large arrays (1D, 2D or 3D) of quantum dots. The readout scheme only requires that that the readout signals for the initial charge transition, i.e. the charge transition that takes place in the spin-to-charge conversion device, are operated at high frequencies, i.e. high read-out frequencies. The other quantum dots (both inside and outside the readout path), may be tuned more slowly as long as their tuning is compatible with qubit operations. Further, a read-out path may be configured into a part of a 2D array of quantum dots to initiate a cascade of charge transitions while the quantum does in the readout path may still host qubits.

The induced cascade of charge transitions in the readout path is caused by the Coulomb repulsion between charge carriers in the quantum dots forming the read-out path. This effect, which may be referred to as a charge cascade effect, allows fast and high-fidelity single-shot spin readout of dots far away from a charge sensor, which is only locally sensitive. In an embodiment, a charge cascade in one or more linear arrays of quantum dots may be used for readout of a quantum-state, e.g. the spin state of a quantum dot or the parity of a superconducting nanowire. A quantum-state-to-charge conversion system may be used to convert quantum state in a charge transition. In an embodiment, such spin-to-charge conversion system may comprise least two quantum dots connected to one end of the read-out path. The Pauli spin blockade (PSB) regime of such double quantum dot may be used as a spin-to-charge system. The triggering of a charge cascade in the read-out path may depends on the outcome of the spin-to-charge conversion system connected to an read-out path. Such readout scheme may be referred to as a cascaded Pauli spin blockade (CPSB) readout scheme.

In an aspect, the invention may relate to a method for readout of one or more quantum states in an array of quantum dots, wherein the method may comprise one or more of the following steps: configuring or providing at least a first read-out path of connected quantum dots, e.g. tunnel barrier connected quantum dots, in the array of quantum dots.

In an embodiment, the configuring of the first readout path may include configuring at least part of the quantum dots of the first readout path close to a charge transition point such that a charge transition at a first end of the first readout path induces a cascade of charge transitions in the quantum dots of the first readout path, a second end of the first readout path being connected to at least a first charge detector.

In a further embodiment, the method may include configuring one or more quantum dots in the quantum dot array into a first quantum-state-to-charge conversion system, the first quantum state-to-charge conversion system being connected to the first end of the first read-out path, the first quantum state-to-charge conversion system including one or more quantum dots hosting a quantum state.

In yet a further embodiment, the method may include obtaining information about the quantum state of the first quantum-state-to-charge conversion system, the obtaining including measuring by the first charge detector a charge transition in one or more quantum dots at the second end of the first read-out path.

Hence, the invention includes the formation of a read-out path between a quantum-state-to-charge conversion system, e.g. a spin-to-charge conversion system, and a charge sensor. The readout path may be simply formed by configuring quantum dots close to a charge transition so that a cascade of charge transitions is induced in the readout path if a charge transition in the quantum state to charge system takes place. This may be realized by controlling one or more dot parameters by applying an external field, e.g. a gate voltage or the like. Alternatively, quantum dots may be configured close to a charge transition by device design, e.g. selection of materials based on bandgap engineering. This way a high-fidelity readout for large 2D arrays of quantum dots may be realized. The scheme allows measuring a quantum state of any quantum dot in the array using just one charge sensor. Further, different readout paths may be configured for measuring quantum states of different quantum dots using different charge sensors.

In an embodiment, the quantum state may be a spin state. Hence, in this embodiment, the one or more quantum dots in the array of quantum dots may host a spin-state. In another embodiment, the quantum state may be a parity state. In this embodiment, one or more quantum dots in the array of quantum dots may be connected via a tunnel barrier to a superconductor system or a semiconductor-superconductor system that exhibits Majorana zero modes, e.g. a superconducting nanowire.

In an embodiment, obtaining information about the quantum state of the first quantum state-to-charge conversion system may further include: measuring a first quantum state, e.g. a singlet state if within a predetermined time period a charge transition is measured in the one or more second quantum dots; or, measuring a second quantum state, e.g. a triplet state, if within a predetermined time no charge transition is measured in the one or more second quantum dots.

In an embodiment, the quantum state may be a spin state, wherein the configuring of the spin-to-charge conversion system may include: configuring the at least two connected quantum dots into a Pauli spin blockade regime.

In an embodiment, the quantum state may be a spin state, wherein the configuring of the spin-to-charge conversion system may include: configuring the reservoir connected quantum dot hosting a spin state into an energy selective tunneling regime.

In an embodiment, at least part of the quantum dots in the first read-out path may be configured close to a charge transition point.

In an embodiment, the configuring may including controlling at least one of the dot parameters, for example by applying a gate voltage to at least part of the quantum dots.

In another embodiment, the quantum dots in the first readout path may be designed using e.g. materials of different bandgaps such that at least part of the quantum dots are close to a charge transition point.

In an embodiment, at least part of the quantum dots in the first read-out path may be tuned close to a charge transition by applying a gate voltage to each or at least a substantial part of the quantum dots.

In an embodiment, the charge transition in the one or more second quantum dots at the second end of the first readout path may include: a charge carrier tunneling from a charge reservoir via a tunnel junction onto one of the one or more second quantum dots at the second end of the first readout path; or, a charge carrier tunneling from one of the one or more second quantum dots at the second end of the first readout path via a tunnel junction onto a charge reservoir.

In an embodiment, the configuring of the first readout path further may include: tuning quantum dots positioned next to the first readout path in a coulomb blockade state.

In an embodiment, the array of quantum dots may be one of: a one-dimensional array of quantum dots, a two-dimensional array of quantum dots or a three dimensional array of quantum dots.

In an embodiment, the read-out path of connected quantum dots may form a linear array of quantum dots.

In another aspect, the method may further comprise one or more of the following steps: configuring at least a second read-out path of connected quantum dots in the array of quantum dots, the configuring of the second readout path including tuning quantum dots of the second readout path in charge states such that a charge transition at a first end of the second readout path induces a cascade of charge transitions in the quantum dots of the second readout path, a second end of the second readout path being connected to the first charge detector or to a second charge detector; configuring one or more quantum dots in the quantum dot array into a second quantum-state-to-charge conversion system, the second quantum-state-to-charge conversion system being connected to the first end of the second read-out path, the second quantum-state-to-charge conversion system hosting a quantum state, preferably a spin state or a parity state; and, obtaining information about the quantum state of the second quantum state-to-charge conversion system, the obtaining of information of the second quantum state-to-charge conversion system including measuring by the first charge detector or the second charge detector a charge transition in one or more quantum dots at the second end of the second read-out path.

In a further aspect, the invention may relate to a method for readout of one or more quantum states in an array of quantum dots, wherein the method may comprise one or more of the following steps: configuring a read-out region of connected quantum dots in the array of quantum dots, the readout region including a plurality of readout paths, the configuring of the read-out region including tuning quantum dots of the readout region in charge states such that a charge transition at a first end of the readout region induces a cascade of charge transitions in the quantum dots of the plurality of readout paths, a second end of the readout region being connected to one or more charge sensors; configuring one or more quantum dots in the quantum dot array into a quantum state-to-charge conversion system, the quantum state-to-charge conversion system being connected to the first end of the read-out region, the quantum state-to-charge system hosting a quantum state, preferably a spin state or a parity state; and, obtaining information about the quantum state of the first quantum state-to-charge system, the obtaining including measuring by the first charge detector a charge transition in one or more quantum dots at the second end of the first read-out path.

In an embodiment, the readout region may form a funnel-shaped array of connected quantum dots.

In an embodiment, at least one quantum dot of quantum state-to-charge conversion system may be connected to at least two neighboring quantum dots that are part of the readout region.

In an embodiment, a first readout path of the plurality of readout paths and a second readout path of the plurality of readout paths may be connected to one charge sensor.

In another embodiment, a first readout path of the plurality of readout paths may be connected to a first charge sensor and a second readout path of the plurality of readout paths may be connected to connected to a second charge sensor.

In yet a further aspect, the invention may relate to a system comprising an array of quantum dots; a controller connected to the array of quantum dots for readout of one or more quantum states in the array of quantum dots, the controller being configured to: configuring at least a first read-out path of connected quantum dots in the array of quantum dots, the configuring of the first readout path including tuning quantum dots of the first readout path in charge states such that a charge transition at a first end of the first readout path induces a cascade of charge transitions in the quantum dots of the first readout path, a second end of the first readout path being connected to at least a first charge detector; configuring one or more quantum dots in the quantum dot array into a first quantum state-to-charge conversion system, the first quantum state-to-charge conversion system being connected to the first end of the first read-out path, the first quantum state-to-charge conversion system hosting a quantum state, preferably a spin state or a parity state; and, obtaining information about the quantum state of the first quantum state-to-charge conversion system, the obtaining including measuring by the first charge detector a charge transition in one or more quantum dots at the second end of the first read-out path.

In an aspect, the invention may relate to a controller connectable to an array of quantum dots for readout of one or more quantum states in the array of quantum dots, wherein the controller may be configured to: configuring at least a first read-out path of connected quantum dots in the array of quantum dots, the configuring of the first readout path including tuning quantum dots of the first readout path in charge states such that a charge transition at a first end of the first readout path induces a cascade of charge transitions in the quantum dots of the first readout path, a second end of the first readout path being connected to at least a first charge detector; configuring one or more quantum dots in the quantum dot array into a first quantum state-to-charge conversion system, the first quantum state-to-charge conversion system being connected to the first end of the first read-out path, the first quantum state-to-charge system hosting a quantum state, preferably a spin state or a parity state; and, obtaining information about the quantum state of the first quantum state-to-charge system, the obtaining including measuring by the first charge detector a charge transition in one or more quantum dots at the second end of the first read-out path.

In yet a further aspect, the invention may relate to a method for readout of one or more spin states associated in an array of quantum dots. The method may include a step of configuring one or more read-out paths of connected quantum dots in the array of quantum dots, the configuring including tuning quantum dots of at least one of the one or more read-out paths in a charge state such that a charge transition in one or more first quantum dots at a first end of the tuned read-out path induces a charge transition in one or more second quantum dots at a second end of the tuned read-out path, the second end being connected to at least one charge detector.

In a further embodiment, the method may include configuring one or more quantum dots of the quantum dot array into a spin-to-charge conversion system connected to the first end of the tuned read-out path, the charge conversion system including at least two connected quantum dots hosting a spin state or a quantum dot hosting a spin state connected to a reservoir.

In an embodiment, the method may include obtaining information about the spin state in the spin-to-charge system, the obtaining information including the charge detector measuring a charge transition in the one or more second quantum dots at a second end of the tuned read-out path.

The invention may also relate to a software program product comprising software code portions configured for, when run in the memory of a computer, executing the any of the method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 4A-4C depict an example of a readout scheme for a spin state in a quantum dot array according to an embodiment of the invention;

DETAILED DESCRIPTION

Figure 1:
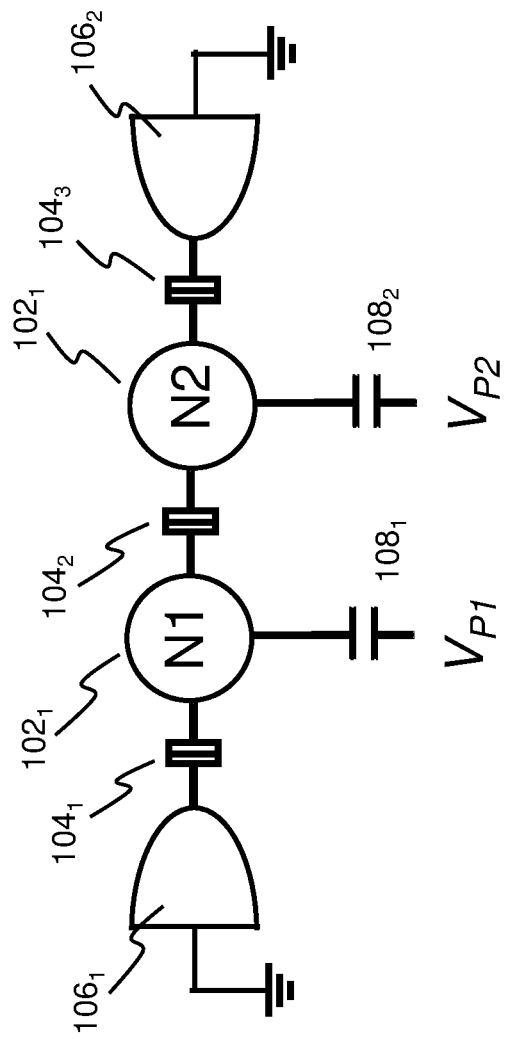
FIG. 1 depict diagrams for a double quantum dot that provides a Pauli spin blockade operation.

FIG. 1 depicts a diagram for a double quantum, including a first quantum dot $102_1$ and a second quantum dot $102_2$, which are coupled via tunnel junctions $104_{1-3}$ to each other and to a first and second reservoir $106_{1,2}$. Voltages on the gate electrodes P1 $108_1$ and P2 $108_2$ may be used to influence the dot potentials of the two dots via capacitive coupling. Tuning the dot potentials controls the number of electrons (N1, N2) on the first and second quantum dot respectively. The Pauli exclusion principle dictates that for a triplet state |T> the electron would have to occupy an excited orbital, which is higher in energy than the singlet state |S>. Thus, if both dots comprise one electron, an electron at the first quantum dot will only tunnel if it can form a singlet state with the electron on the second quantum dot, while for a triplet state the electron will not tunnel as the excited triplet state is energetically inaccessible. This blocking of the tunnelling due to the spin state of the electron is referred to as the Pauli spin blockade (PSB). Hence, depending on the spin state on the double quantum dot system, the PSB may result in a charge transition which depends on the spin state of the electrons.

The PSB regime in the double quantum dot system as described with reference to FIG. 1 can be used in a spin-to-charge conversion system, wherein depending on the spin-state a charge transition in the quantum dot system can be sensed by a nearby (typically neighbouring) charge detector. This way, information about the spin configuration may be deduced from the charge configuration. A spin-to-charge conversion system that is based on the PSB may be referred to as a PSB spin-to-charge conversion system. Such systems are described in more detail hereunder.

Figure 2B:
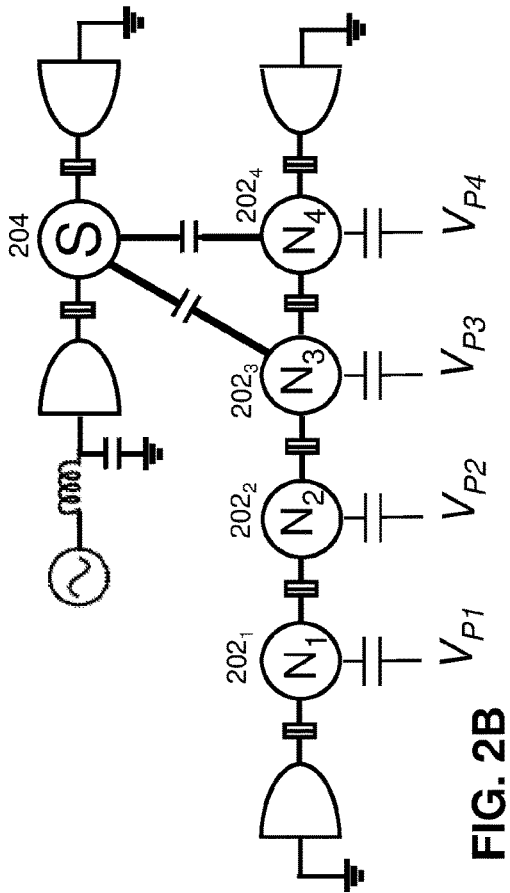
FIG. 2A-2C depict an example of a readout scheme for a spin state using Pauli spin blockade operation.
Figure 2A:
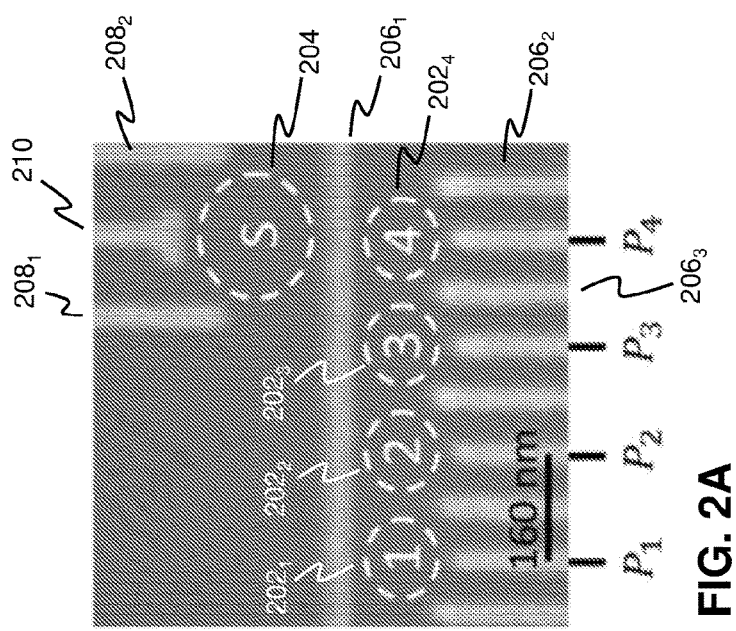
Figure 2C:
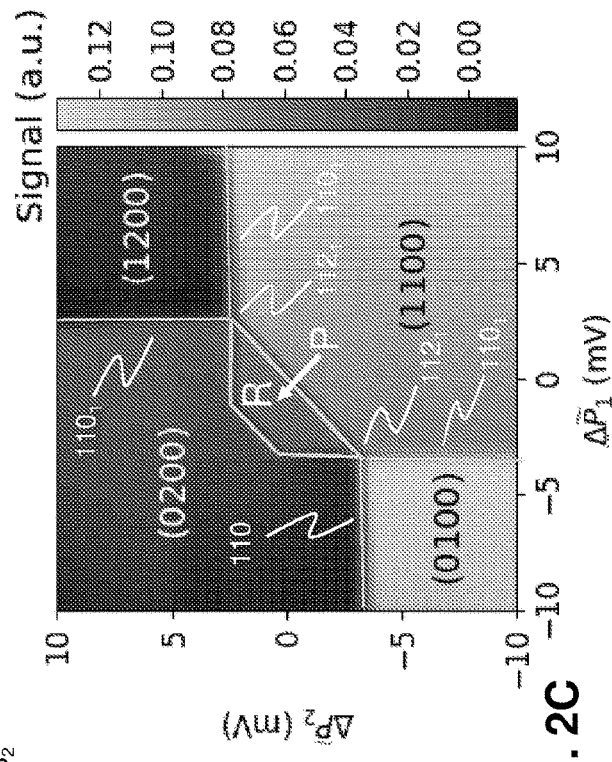

FIG. 2A-2C depict an example of a PSB readout system. The system may include a plurality of linearly connected quantum dots, e.g. a quadruple quantum dot array connected to a quantum dot that is configured as charge sensor. FIG. 2A depicts a scanning electron microscope (SEM) picture of the array of quantum dots which is coupled by a capacitor to a charge sensor that is configured to readout of a spin state of a quantum dot in the array. The dashed, white circles indicate the position of the dots $202_{1-4}$. The dashed, white circle with letter "S" inside indicates the location of a quantum dot 204 which is configured as a so-called single-electron tunnelling (SET) transistor. Such SET transistor may be used as a highly sensitive charge detector. The charge detector may be capacitively coupled to the array of quantum dots. FIG. 2B depicts an equivalent circuit diagram of the structure, including the four tunnel-junction coupled quantum dots where each quantum dot is connected to a gate electrode. As shown in FIG. 2B, the charge sensor may be connected to an impedance-matching circuit to achieve high-bandwidth readout by implementing the RF reflectometry technique.

The device in FIG. 2A includes a plurality of metal electrodes which are formed on the surface of a silicon-doped GaAs/AlGaAs hetero-structure which includes a two-dimensional electron gas (2DEG) 90 nm below the surface. By applying voltages on the electrodes the potential landscape in a two-dimensional electron gas may be controlled in order to allow a predetermined number of electrons in each quantum dot. For example, each of the plunger gates $202_{1-4}$, labelled with $P_i$ (i=1, . . . 4) may be tuned so that the 2DEG becomes depleted until a quantum dot contains one electron.

Due to Coulomb repulsion between electrons in neighbouring quantum dots, the electron occupation of a quantum dot may be influenced by the electron occupation of other quantum dots, e.g. a neighbouring quantum dot. Whether or not such influence results in a change in charge occupation of a quantum dot (e.g. through tunnelling of an electron) depends on the tuning of the individual quantum dots which may be achieved by applying gate voltages to the gate electrodes $P_1$-$P_4$.

FIG. 2C depicts a charge-stability diagram stable charge states for the four quantum dots as a function of the gate voltages. The diagram depicts the charge states of the four dots as a function of gate voltages Vp1 and Vp2. The diagram depicts areas in which the charge state of each quantum dot is stable. For example, the upper left region represents the (0200) state, while the lower right region represents the (1100) state. Boundaries $110_{1-4}$ demark the regions of different charge states. Such boundary line may be referred to as an inter-dot transition line. Changing the gate voltages to move through the inter-dot transition line, which connects the two triple points $112_{1,2}$, the double quantum dot system may be brought into state that is located in a trapezoid region in which the double quantum dot system is governed by the so-called Pauli spin blockade (PSB). This region in the charge-stability diagram may be referred to as the PSB readout region.

Thus, if the gate voltages are set to point P that is located in charge state (1100), both quantum dots comprise a charge carrier, e.g. an electron or a hole, associated with a spin state. Then, the gate voltages may be changed to move the system into the PSB readout region which is governed by the PSB. In the PSB readout region only for a singlet state a charge carrier, e.g. an electron, will tunnel so that the system moves into the (0200) region. In case of a triplet state however the charge carrier will not tunnel as the excited state is energetically inaccessible so that the electron is blocked from tunnelling due to the Pauli spin blockade (PSB). Hence, depending on the spin state of the electron in the first quantum dot, a charge transition may or may not occur depending on the spin state of the electron. The double dot system operated in the PSB regime effectively serves as a spin-to-charge conversion system. Such a charge transition can be measured by the charge sensor, e.g. a charge detecting quantum dot.

A charge transition may be detected by measuring the resistance of the charge detecting quantum dot, either in transport or with a radio-frequent reflectometry circuit for broadband readout. The Coulomb repulsion however falls off with distance, hence direct detection of charge movements in quantum dots of the array that are positioned further away from the charge detector, e.g. quantum dots $202_1$ and $202_2$ in FIG. 2B, may be difficult or—for longer linear quantum dots arrays—even impossible. This problem is even more prominent in large 2D arrays of quantum dots, in which quantum states, e.g. a spin state, of individual quantum dots at different locations in the 2D array need to be determined.

Figure 3:
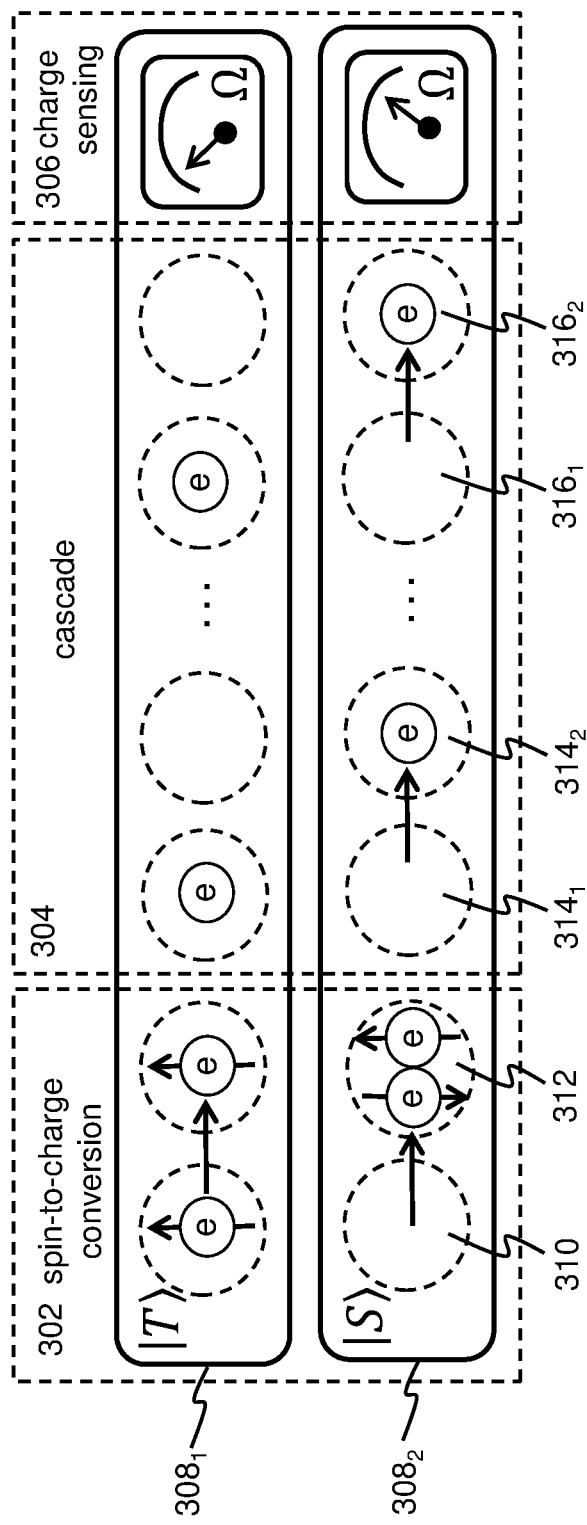
FIG. 3 depicts a schematic of a readout scheme for measuring a quantum state in an array of quantum dots according to an embodiment of the invention.

The current invention addresses this problem by configuring a so-called read-out path in an array of quantum dots. This is schematically shown in FIG. 3, depicting a illustration of readout scheme for measuring a spin state in a quantum dot array according to an embodiment of the invention. In particular, the figure illustrates a spin-to-charge conversion system 302 that is connected to a cascade readout path 304 to enable spin readout of a quantum dot that is located far away from a charge sensor 306. In an embodiment, the read-out path may comprise at least two quantum dots. A Pauli spin blockade may be used to realize a spin-to-charge conversion system based on two quantum dots that are coupled to one end of the readout path. Further, a charge sensor is coupled to the other end of the readout path. The quantum dots in the readout path may be tuned near to charge transition points so that a charge transition in the spin-to-charge conversion system into a singlet state may induce a cascade of charge transitions $314_{1-n}$, between quantum dot pairs (and optionally between quantum dot and a reservoir) wherein a final transition is realized close to the charge sensor, causing a substantial change in the sensor resistance.

The read-out path may be formed by tunnel-junction connected quantum dots, which can be controlled by a gate voltage. Configuring the read-out path may include tuning quantum dots of the read-out path in a charge state such that a charge transition in one of the first quantum dots at a first end of the tuned read-out path induces a charge transition in one or more second quantum dots at a second end of the tuned read-out path. In particular, the gate voltages of the quantum dots of the read-out path may be tuned so that a charge transition in one of the first quantum dots at the first end may induce a cascade of charge transitions in the quantum dots, including a charge transition in one of the quantum dots at the second end of the tuned read-out path. Configuring a spin-to-charge conversion system at the first end of the tuned read-out path, and configuring the second end of the tuned-read-out path close to a charge sensor, e.g. a single electron transistor that is configured as a highly sensitive electrometer, allows high-fidelity read out of a spin state at an arbitrary position in the array by the charge sensor.

The quantum dots of the read-out path are configured close to charge transition points, so that when a read-out signal brings the spin-to-charge conversion system in the PSB readout region, a charge transition in the spin-to-charge conversion system may induce a cascade of charge transitions in the quantum dots of the readout path. This cascade of charge transitions may be sensed by a charge sensor that is connected to a quantum dot in the charge read out path, wherein the charge sensor may be located at a remote location, e.g. the edge of the quantum dot, away from the spin-to-charge conversion system. Thus, a readout signal applied to a spin-to-charge conversion system, may convert a spin of an electron in the spin-to-charge version system, into an initial charge transition, which induces a chain reaction (a cascade) of charge transitions in the read-out path, including a charge transition that occurs nearby the charge sensor, which may cause a large response in sensor signal. The readout scheme illustrated in FIG. 3 may be referred to as called cascade Pauli spin blockade (CPSB) readout FIG. 4A-4C depicts the formation of a read-out path in an array of quantum dots according to an embodiment of the invention. In particular, these figures illustrate the formation of a readout path of connected quantum dots connecting a spin-to-charge conversion system (in this case a double quantum dot system) to a charge sensor. The spin-to-charge conversion and the read-out path may form an example of a so-called cascade Pauli spin blockade (CPSB) readout. In this particular embodiment, the CPSB readout may be based on a quantum dot array as described with reference to FIGS. 2A and 2B.

FIG. 4A depicts a charge-stability diagram of the quantum dot array for charge transitions between the first and second quantum dot, wherein the cascade effect affects the charge occupation of the fourth quantum dot. Numbers in round brackets indicate charge occupations of the dots in the array. The trapezoid represents the CPSB readout region. FIG. 4B depicts a charge-stability diagram showing the effect of the inter-dot transition for the first and second quantum dots on the level and occupation of the forth quantum dot. FIG. 4C depicts a ladder diagram illustrating the tuning of the energy levels of the quantum dots for the CPSB readout. Here, the solid levels are accessible charge levels while the dashed levels are inaccessible.

To combine a PSB readout with a cascade read-out path (which may be referred to in short as a read-out path) that at the end is capacitively coupled to a charge sensor, the right most quantum dot in the array is operated as an auxiliary dot. The level of the auxiliary dot is tuned close to a charge transition, in this case a dot-reservoir transition wherein an electron tunnels from the last (forth) quantum dot to the reservoir. Due to the movement of an electron from the first to the second quantum dot, a change in charge occupation of the auxiliary dot induced. In this particular, example the third quantum dot may be kept empty during all operations and thus effectively behaves as a barrier between the first and second quantum dots and the forth auxiliary dot. Hence, in this example, the third and fourth quantum dot is configured as a read-out path having a first end that is connected to a spin-to-charge conversion system formed by the first and second quantum dots and a second end that is connected by a capacitor to a charge sensor.

Thus, as shown in FIG. 4A, the gate voltages of the quantum dot array may be used to tune the system into a (1101) charging state (point P), wherein the first and second quantum dot each comprise one electron, the third quantum dot no electron and the forth quantum dot one electron. Thereafter, the gate voltages of the first and second quantum dotes may be controlled so that the first and second quantum dots are tuned into the CPSB readout region (point R) denoted by the trapezoid region. The charge occupation of the quantum dots after moving through the inter-dot line into the CPSB readout region depends on the spin configuration of the two electrons in the first and second quantum dots. The Pauli exclusion principle dictates that for a triplet state the electron would have to occupy an excited orbital, which is higher in energy. Hence, in the CPSB readout region the array will switch between the (1100) and (0200) charge regions depending on the spin state of the electron on the first quantum dot.

When changing the voltages to move from the (1100) charge region into the CPSB readout region only for a singlet state the electron will tunnel, while for a triplet state the electron will not tunnel because the excited orbital is energetically inaccessible. The Pauli spin blockade thus results in a spin-to-charge conversion, which can be sensed which is coupled through the read-out path to the charge detector. As shown in FIG. 4C, when the electrons of the two quantum dots form a singlet state, the charge state of the system may change from (1101) to (0201) as depicted by transition 402. The latter charge state will relax adiabatically to the (0200) singlet state (transition 404). This is because the (0201) state will cause an electron on the auxiliary dot to be pushed off as indicated by transition 406, due to the charge cascade induced by the charge transition between the first and second quantum dots. Alternatively, if a Pauli spin blockade prohibits an electron to tunnel to the second quantum dot, no charge transition will occur.

This way, information about the spin state of the first quantum dot may be determined on the basis of the charge sensor signal. If no charge transition is measured by the charge sensor within a predetermined time interval, i.e. a low sensor signal, it may be determined that the spin state is a first spin state, e.g. a triplet state. if a charge transition is measured by the charge sensor with the predetermined time interval, i.e. a high sensor signal, it may be determined that the spin state is a second spin state, e.g. a singlet state.

Although the embodiments are illustrated based on a Pauli spin-blockade charge-to-conversion systems other types of spin-to-charge systems may be used as well. For example, a spin-to-charge conversion system may be used that is based on energy selective tunnelling. Such conversion system may include a quantum dot comprising spin states that is connected on one side via a cascade-tuned read-out path to a charge sensor and one the other side is connected to a charge reservoir. An example of such readout is described by Elzerman, J. M. et al. *Single-shot read-out of an individual electron spin in a quantum dot*. Nature 430, 431-435, 505 (2004).

More generally, the cascade readout path as described with reference to the embodiments may also be used to measure other types of quantum states in an array of quantum dots. For example, the invention may also be used together with a parity-to-charge conversion system that may readout the parity of a topological qubit, such as topological Majorana qubits. Such qubits may be realized using an 1D topological superconductor, e.g. a superconducting quantum wire, which may be connected to a quantum dot. The 1D topological superconductor has a two-fold degenerate ground state, which are distinguishable by their fermion parity, i.e. even or odd. Such parity to charge conversion system is described for example by Assen et al., in their paper *Milestones Toward Majorana-Based Quantum Computing*, PRX (2016).

Figures 5A, 5B:
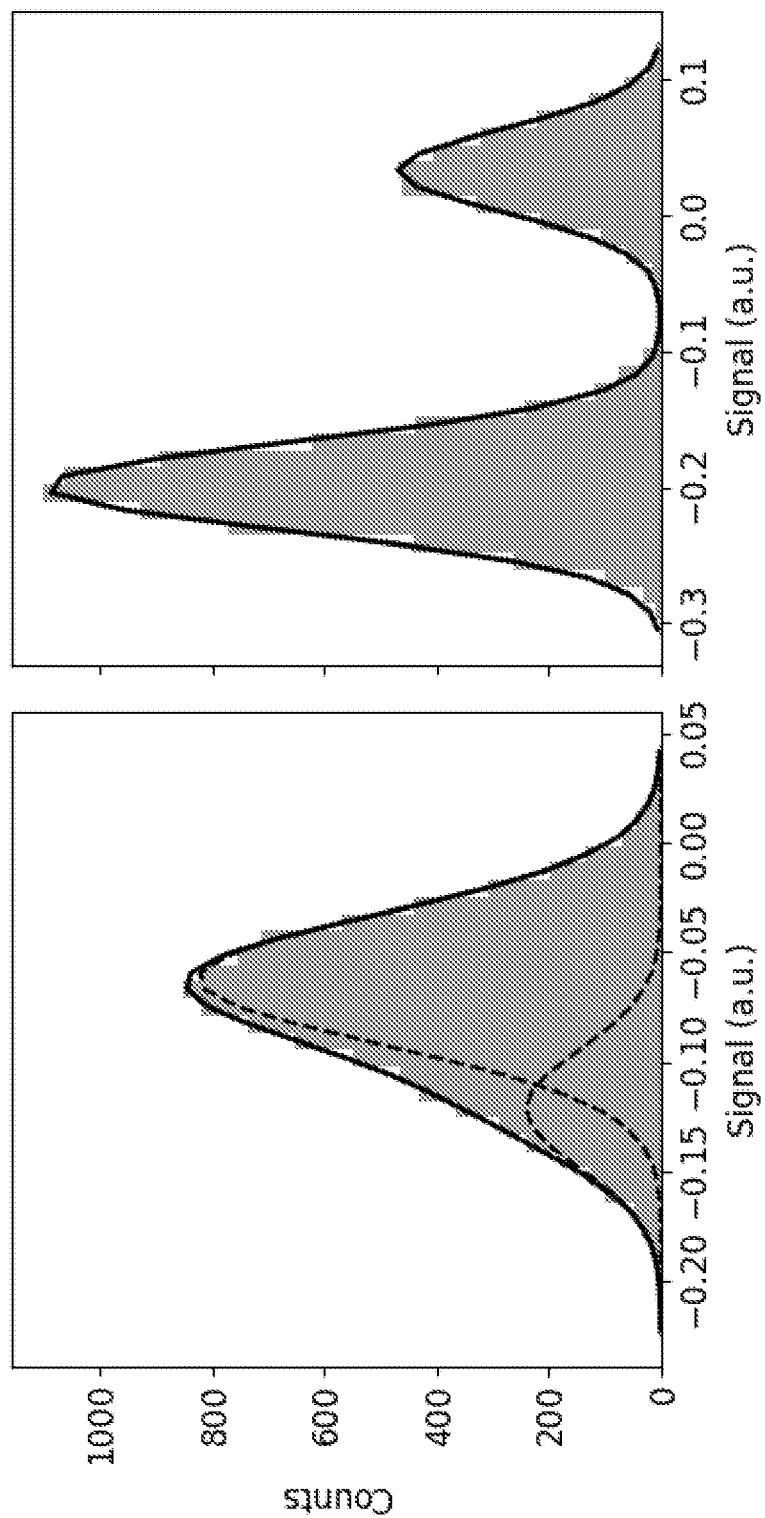
FIGS. 5A and 5B depict histograms of single-shot measurements using readout schemes described in this application.

FIGS. 5A and 5B depict histograms of single-shot measurements using readout schemes as described with reference to FIGS. 3 and 5 respectively. In particular, FIG. 5A depicts a histogram of 10,000 single-shot PSB measurements of spin states using a readout scheme as described with reference to FIG. 3. These readout measurements do not include the formation of a charge readout path according to the various embodiments in this application. Thus, the charge signal is purely through capacitive coupling between the spin-to-charge conversion system and a remote charge detector. The spin states were randomly prepared by loading an electron from the reservoir onto the first quantum dot by tuning the quantum dots from a (0100) into a (1100) charging state and then tuning the system from the (1100) charging state to the SPB readout region in the charge-stability diagrams.

For each single-shot the signal is integrated for 1.5 µs. The peak at lower sensor signal corresponds to the (0200) charge state, and is assigned as singlet, while the peak at higher sensor signal corresponds to the (1100) charge state, which is assigned as a triplet state. The histogram is fitted (solid line) wherein the dashed lines indicate the singlet and triplet probability distributions, with the left (right) peak corresponding to the singlet (triplet) state. Residual overlap between the singlet and triplet distributions induces errors in the distinction of the two charge states, resulting in errors in the spin readout, hence reducing the readout fidelity.

FIG. 5B depicts a histogram of 10,000 single-shot CPSB measurements of spin states, which were randomly prepared by loading an electron from the reservoir onto the first quantum dot by tuning the quantum dots from a (0101) into a (1100) charging state. For each single-shot the signal is integrated for 1.5 µs. The peak at lower sensor signal corresponds to the (1101) charge state, and is assigned as triplet, while the peak at higher sensor signal corresponds to the (0200) charge state, which is assigned as a singlet state. The histogram is fitted (solid line), wherein the left (right) peak corresponds to the triplet (singlet) state. When compared to the PSB readout results of FIG. 5A, the residual overlap between the singlet and triplet distributions is strongly reduced for CPSB readout results of FIG. 5B indicating a higher readout fidelity.

Figure 6:
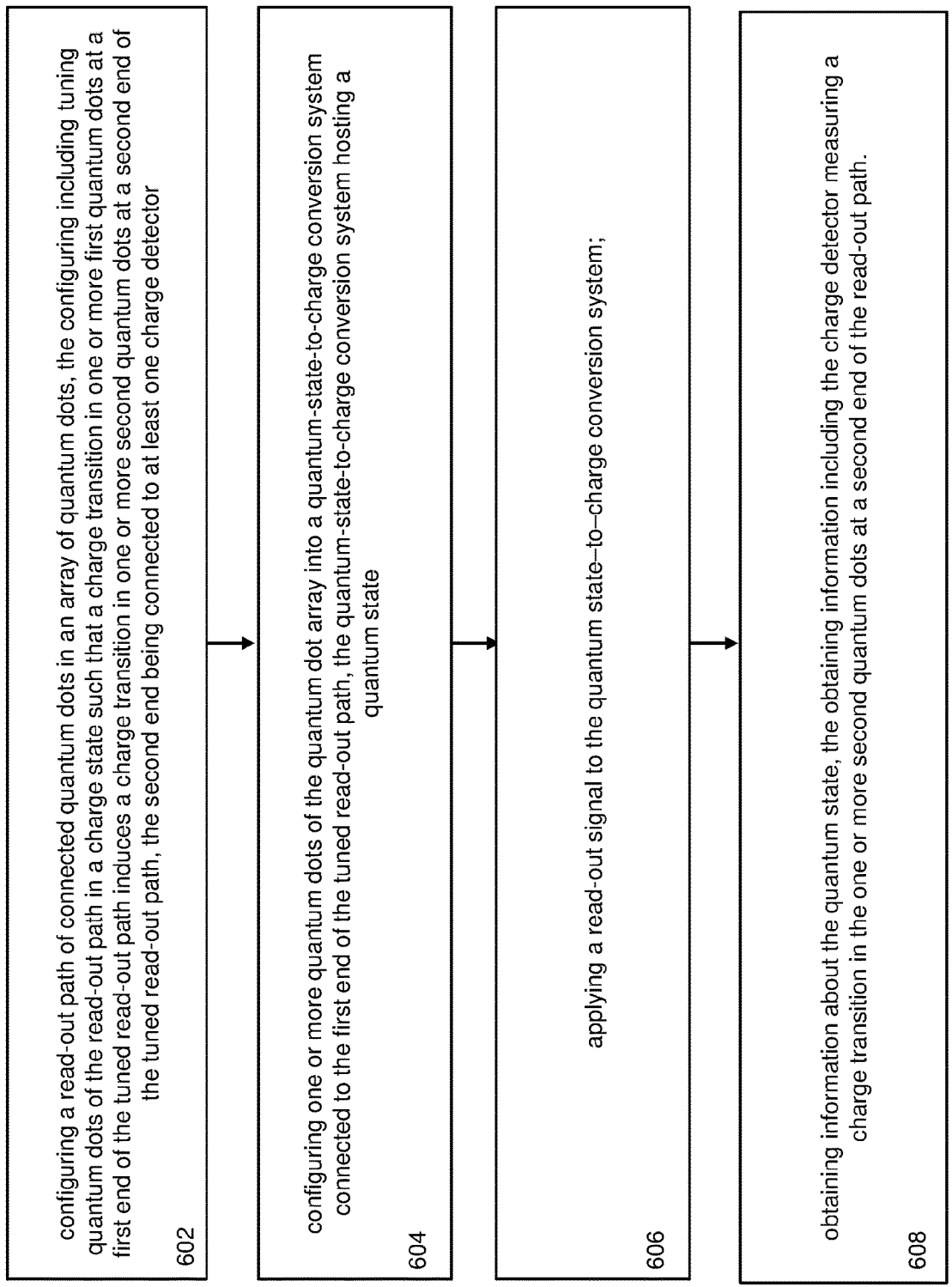
FIG. 6 depicts a method for readout of a quantum state in an array of quantum dots according to an embodiment of the invention.

FIG. 6 depicts a method for readout of one or more quantum states in an array of quantum dots according to an embodiment of the invention. As shown by the figure, in a first step 602, the method may include configuring a read-out path of connected quantum dots, e.g. tunnel barrier connected quantum dots, in the array of quantum dots. The configuring of the read-out path may include tuning quantum dots of at least one of the one or more read-out paths in a charge state such that a charge transition in one or more first quantum dots at a first end of the tuned read-out path induces a charge transition in one or more second quantum dots at a second end of the tuned read-out path. A tuning may be realize such that a cascade of charge transitions can be induced in the readout path. The second end may be connected to at least one charge detector. In a further step 604, one or more quantum dots of the quantum dot array are configured into a quantum-state-to-charge conversion system that is connected to the first end of the tuned read-out path, Here, in an embodiment, the quantum-state-to-charge charge conversion system may host a quantum state. Alternatively, the quantum-state-to-charge conversion system may include a quantum dot hosting a spin state connected to a reservoir. A read-out signal may be applied to the quantum state-to-charge conversion system (step 606) and thereafter information about the quantum state in the spin-to-charge system may be obtained (step 608). This step may include measuring a charge transition by the charge detector in the one or more second quantum dots at a second end of the tuned read-out path.

One of the major advantages of extending the readout with a cascade is the signal enhancement. In FIG. 5 a signal enhancement of 3.5 is achieved when comparing the CPSB scheme to the PSB readout scheme. For PSB readout scheme the single-shot signal consists of the charge states (1100) and (0200), while for CPSB readout scheme the charge states are (1101) and (0200). For this CPSB readout the signal enhancement consists of two contributions, while for a cascade with as final transition an inter-dot transition there would be only one contribution. The first contribution to the enhancement, which applies for both types of CPSB, is directly due to the cascade, which maps a charge transition far away from the sensor to a charge transition nearby the sensor. The longer the cascade, the larger this contribution to the enhancement since the final charge transition remains the same, but the initial transition would be further away for a longer cascade, hence induce a weaker sensor signal, resulting in a larger ratio between the signals for the final and the initial transition. The second contribution to the signal enhancement is that the final transition is a dot-reservoir transition. Thus, the initial transition, which is an inter-dot transition, is mapped to a dot-reservoir transition, which has a stronger influence on the sensor.

For PSB the signal of the charge state corresponding to a singlet is lower than that for a triplet, while for the CPSB the signal for a singlet is actually higher than for a triplet. For both measurements, the charge sensing quantum dot (the charge sensor) is operated at a rising flank of a Coulomb peak and with very similar sensitivity. With the PSB readout scheme, the singlet signal corresponds to a charge moving closer to the charge sensor, hence the sensor signal goes down. For CPSB a singlet outcome would also cause a charge to move closer to the charge sensor, but on top of that a charge is pushed out of the auxiliary dot, reducing the total charge on the dot array and removing a charge which was very close to the sensor. In this case the two contributions to the signal enhancement partially cancel each other, but the resulting effect on the charge sensor is still stronger for CPSB than for normal PSB.

The readout fidelity may be reduced by various sources of errors, for example relaxation, non-adiabaticity and excitations. To obtain the fidelity for the CPSB read-out shown in FIG. 5B the different error sources are analysed. From the fit to the single-shot histogram an error of $\varepsilon_{hist}=0.068\%$ for the average readout fidelity is obtained. Combining the errors resulted in an average readout fidelity of 99.92% achieved in 1.5 microsecond integration time. This shows that the CPSB readout provides high-fidelity readout. Additionally, the readout according to the various embodiments in this application only require that the gate voltages for the initial charge transition, i.e. the charge transition that takes place in the spin-to-charge conversion device, are operated at high frequencies, i.e. high read-out frequencies. The other quantum dots (both inside and outside the readout path), may be tuned more slowly as long as their tuning is compatible with qubit operations.

Currently, for 2D quantum dot arrays readout is commonly performed using a sensing dot that is configured as a charge sensor. So far, 2D quantum-dot arrays are still relatively small so charge sensing in these arrays may still be performed using local charge sensors. However, for large two-dimensional quantum-dot arrays, the placement of charge sensors nearby each quantum dot is problematic. The main advantage of two-dimensional arrays over one-dimensional arrays is the higher connectivity, which would be heavily reduced by placing charge sensors within the two-dimensional array, as the charge sensor also needs a reservoir in order to measure the sensor resistance.

Figure 7:
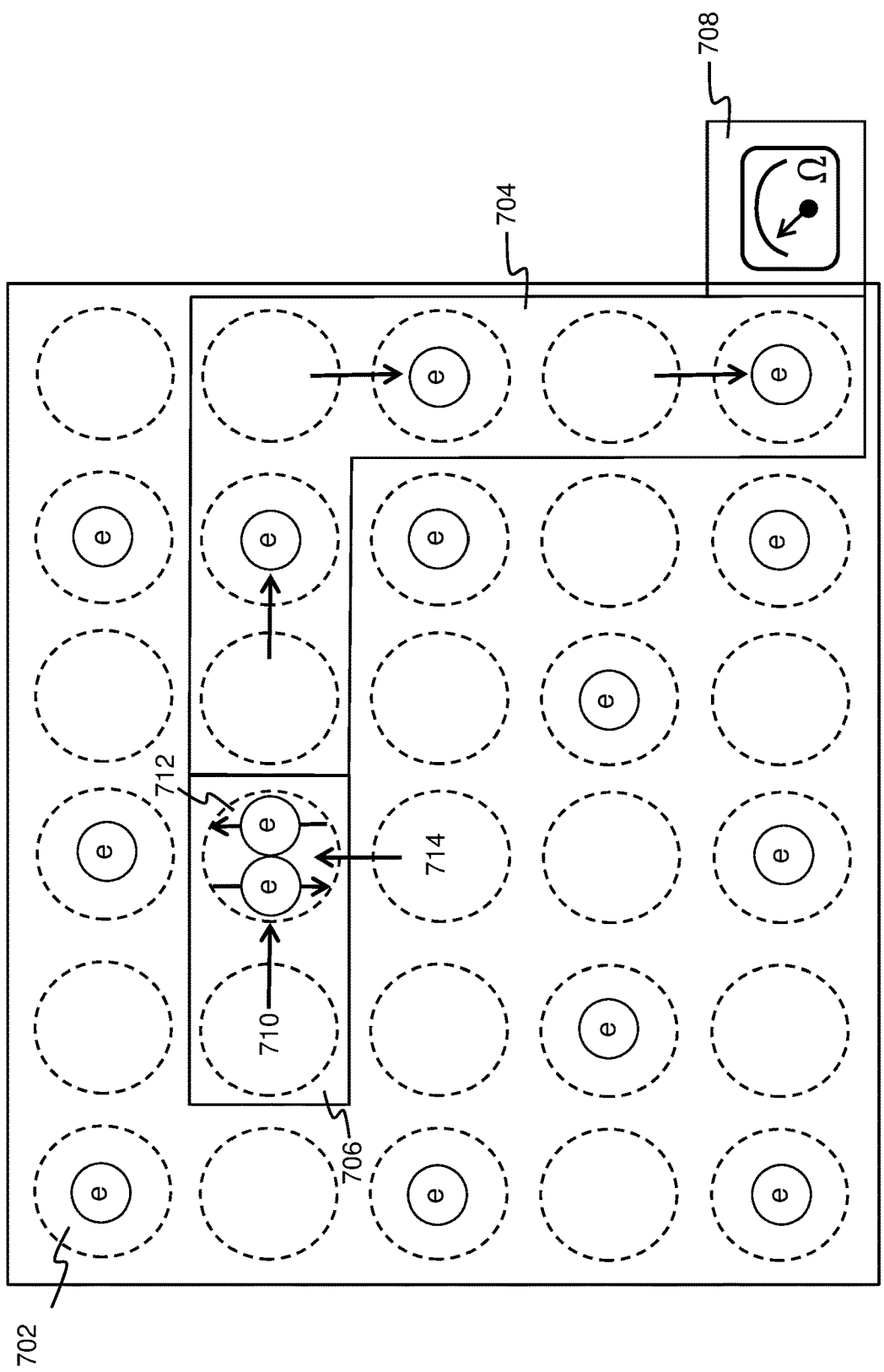
FIG. 7 depicts a formation of a readout path in a two-dimensional quantum-dot array according to an embodiment of the invention.

FIG. 7 depicts the formation of a readout path in a two-dimensional quantum-dot array according to an embodiment of the invention. Quantum dots 702 (indicated by the white dashed circles) may be arranged in a chequerboard manner, however other patterns may also be used. Each quantum dot can be controlled by applying a gate voltage to a gate electrode that is capacitively connected to the dot. Further, the connection between quantum dots may be controlled by barrier electrodes, which allow tuning of a tunnelling barrier between each quantum dot. A read-out path 704 in the 2D array connecting a spin-to-charge conversion site 706 to a charge sensor 708 may be configured by operation of the gate electrodes and the barrier electrodes. In operation, a charge carrier in a first quantum dot 710 may be moved to quantum dot 712 that is located next to a quantum dot 714 with an electron. A readout signal may be applied to the Pauli spin blockade readout attempting to push both electrons on the same dot. For the singlet outcome, a charge transition will, which is the initial charge transition that induces a cascade of charge transitions in the read-out path. In that case, a charge may be moved closer to the sensor, causing a relatively high sensor signal (due to a change in the resistance of the charge sensor).

The use of read-out paths in a 2D array of quantum dots can be used to readout different quantum dots with the same sensor. This can be done by configuring different cascade read-out paths, which connected different quantum state-to-charge system to the same charge sensor. In an embodiment, in a 2D array, a readout path may form a linear array having different orientations. Further, in embodiment, different readout paths may connect different charge sensors to different quantum dots.

Figure 8A:
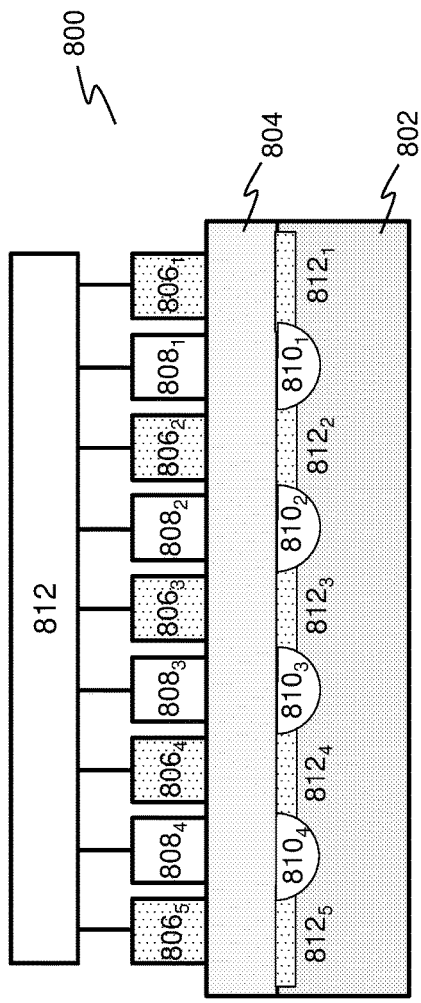
FIGS. 8A and 8B depict the side view and top view of two-dimensional quantum-dot array for implementing the readout schemes described in this application.
Figure 8B:
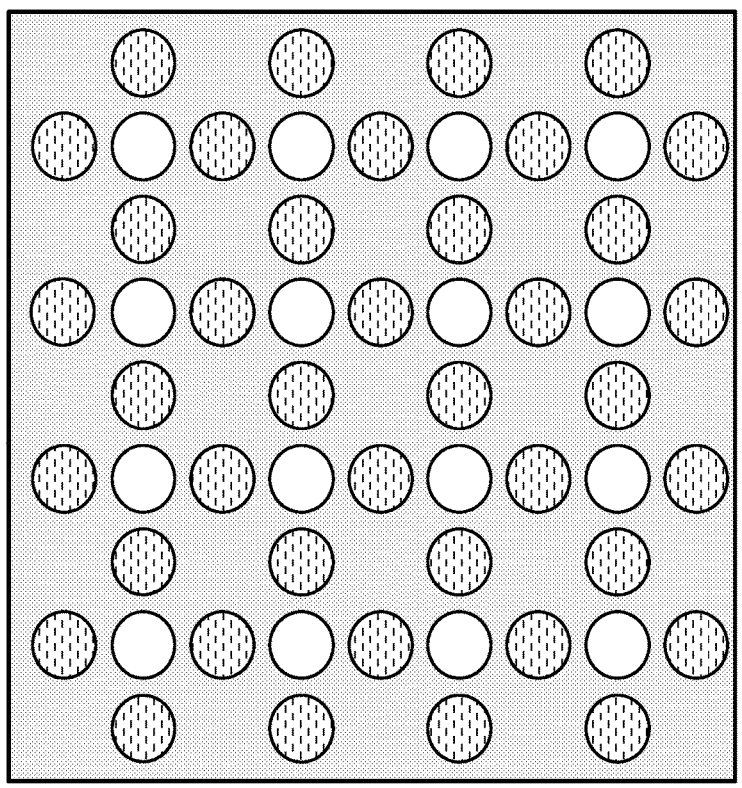

FIGS. 8A and 8B depict the side view and top view of a system comprising two-dimensional quantum-dot array 800 connected to electronics 812, e.g. a computer or a controller, for executing the readout schemes as described in this application. In particular, FIG. 8A depicts the side view of a semiconducting structure, including a semiconductor substrate 802. An insulating layer 804 formed over the top surface of the substrate isolates gates from quantum dot regions 810, which are formed in the substrate. The quantum dots may be any type of structure suitable for functioning as a quantum dot, a donor site, a depleted 2D, etc. The potential of the quantum dots may be controlled by applying voltages to gate electrodes $808_{1-4}$ and the tunnel couplings between dots may be controlled by applying voltages to barrier electrode $806_{1-5}$. The gate electrodes and barrier electrodes may be patterned so that a two-dimensional quantum-dot array can be formed by applying voltages to these electrodes. For example, in case the substrate includes a 2DEG hetrostructure, the voltages on the gates may deplete and shape the 2DEG into tunnel barrier connected quantum dots forming 2D quantum-dot array. As shown in FIG. 8B, a 2D array of quantum dots may be arranged underneath the gate and barrier electrodes. In particular, quantum dots $810_{1-4}$ may be located under the gate electrodes and tunneling regions $812_{1-5}$ underneath the barrier electrodes may be located between the quantum dots. Additionally, charge-carrier reservoirs, e.g. source and drain regions, (not shown) may be formed into the substrate which may be connected via a tunnel barrier to quantum dots. In an embodiment, a barrier electrode may be controlled to form a barrier between two quantum dot, such that no electron tunneling takes place between the dots. This way, a capacitive coupling between the two dots may be achieved. The gate electrodes are connected to electronics that allow individual control of one or sets of gate electrodes so that readout paths and quantum state-to-charge conversion system as described in this application can be realized.

It is submitted that FIGS. 8A and 8B illustrate only one example of a 2D quantum dot array that is suitable for readout based on one or more cascade readout paths according to the described embodiments. For example, in case of a parity-to-charge conversion system, the quantum dot array may include 1D topological superconductors, e.g. superconducting quantum wires, which may be connected to a quantum dot.

Figure 9B:
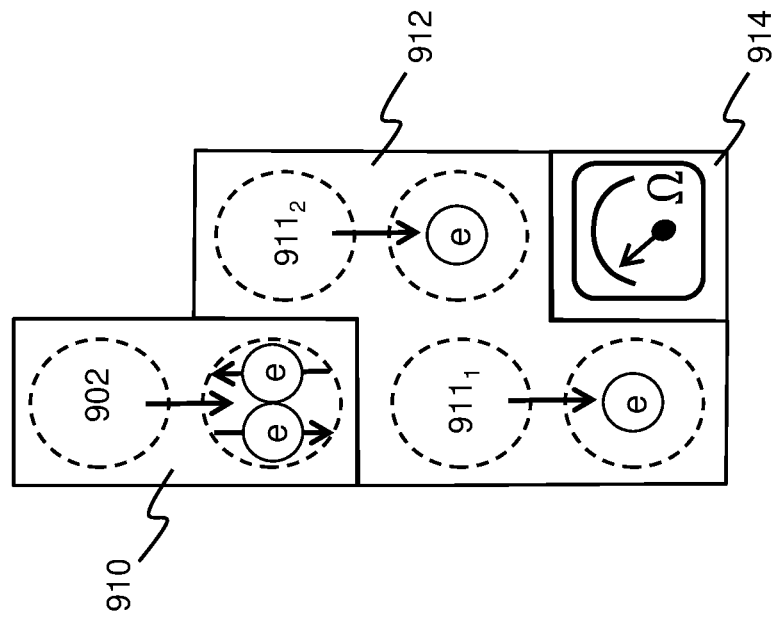
FIGS. 9A and 9B depict readout schemes in array of quantum dots with a fan-out into multiple read-out paths with one or multiple charge detectors.
Figure 9A:
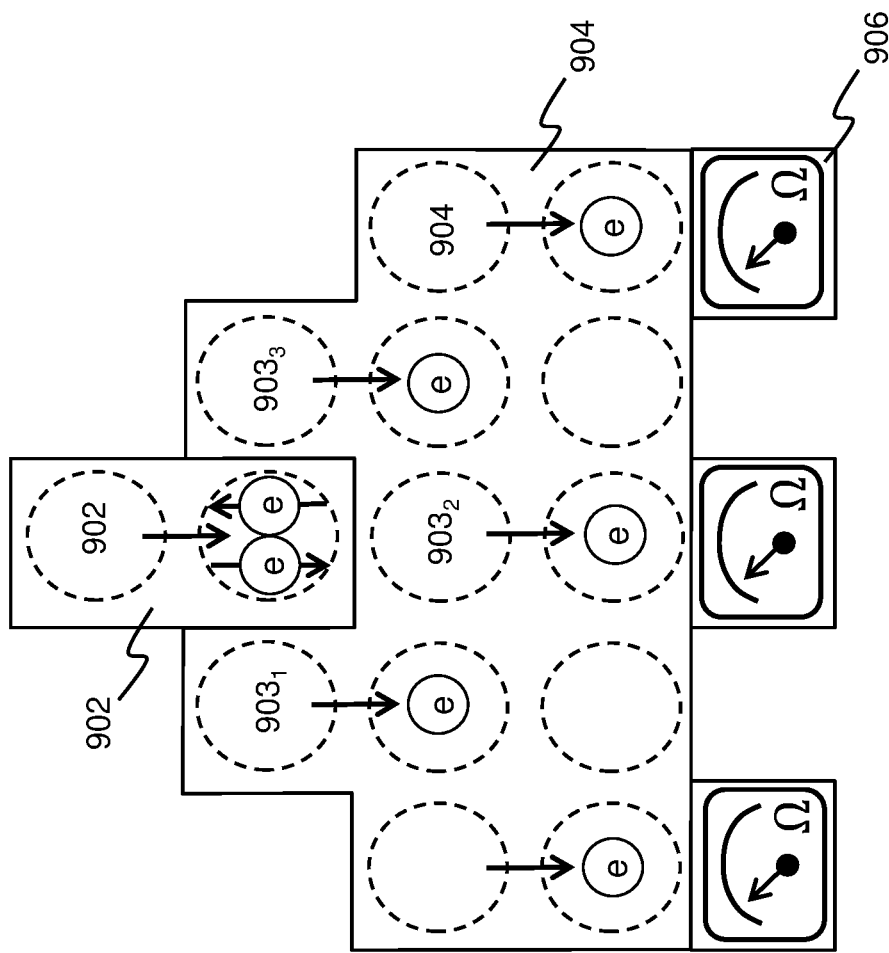

FIGS. 9A and 9B depict readout schemes for quantum dots in an 2D array of quantum dots according to various embodiments. In particular, FIG. 9A depicts a spin-to-charge conversion system 902 connected via a readout region 904 to a plurality of charge sensors $906_{1-3}$. Here, the readout region may have a predetermined geometry, in this case a funnel shape, including a first end (the top of the funnel) and a second end (the base of the funnel), wherein the read-out regions fans-out into multiple readout paths connected to multiple charge sensors $906_{1-3}$. As shown in the figure, at least one of the quantum dots $906_{1-3}$ of the spin-to-charge conversion region may be connected to two or more (in this example three) neighboring quantum dots, that are part of the first end of the funnel-shaped readout region. Hence, these quantum dots of the read-out region are closely coupled to the quantum state-to-charge conversion system. This way, upon an initial charge transition in the spin-to-charge conversion region, a cascade of charge transitions in the read-out region is triggered, which is fanned out in a plurality of parallel read-out path so that multiple charge sensors at the second end (the base) of the funnel shaped read-out region and detect charge transitions induced in the cascade read-out region.

Hence, in this embodiment, it is shown that the read-out region is not necessarily a linear array of quantum dots but may have a predetermined geometry. A group of quantum dots may be configured to define a read-out path geometry in which a charge transition in the spin-to-charge system that is connected to a first end of a read-out region may cause a funnel-shaped read-out region having multiple readout paths. The signals from multiple charge detectors can be combined to achieve a signal enhancement.

FIG. 9B depicts a spin-to-charge conversion system connected to the first end a read-out region that may comprise multiple readout paths. Each second end of those readout paths is connected to the same charge detector. As shown in the figure, at least one of the two quantum dots $906_{1,2}$ of the spin-to-charge conversion region may be connected to at least two neighboring quantum dots, that are art of the first end of a readout region which may include multiple readout paths. An initial charge transition in the spin-to-charge conversion system may trigger a cascade of charge transitions in each of the multiple read-out path. Further, at the second end of the readout region, a charge sensor is connected with each or at least a part of the multiple readout paths so that multiple charge transitions in the vicinity of the charge detector enable to achieve a signal enhancement of the charge sensor.

In FIGS. 4 and 7 examples of quantum-dot arrays are depicted wherein a first part of the quantum dots host one charge carrier, e.g. one electron, and a second part of the quantum does host no charge carrier. However, higher filling can still allow for a cascade. The readout paths are illustrated based on an induced a "pushing effect", by which electrons in the readout path are move away from the location of the initial transition (the spin-to-charge conversion system). However, in an embodiment, a cascade in a readout path may also configured to create a pulling effect. In that case, electrons in the read-out path are moved towards the location of the initial transition (the spin-to-charge conversion system).

Further, in an embodiment, a readout path in a quantum-dot array may be configured, wherein the quantum dots in the readout path are tuned close to unity filling with a pushing effect. This would result in a latching state. For example, a readout path comprising a one-dimensional array be configured into an initial charge configuration (11011 . . . 1) wherein the left most states are the states of the dots of the quantum state to charge system. The empty dot for the cascade with a pushing effect behaves as a high tunnel barrier, but this empty dot will be helpful when considering a read-out path with pulling effect. To configure a read-out path with pushing effect, an initial transition on the first and second quantum dot may result in the charge state (02011 . . . 1). However, the cascade of charge transitions will not be induced as the additional Coulomb repulsion cannot push the electron on the fourth dot to the fifth dot, because the fifth dot is still occupied, and so on. The electron on the right-most dot will not move as the effect of the change in Coulomb repulsion due to the initial transition is negligible for the electron far away. Thus, the system remains in meta-stable state. When a cascade with a pulling effect was implemented an initial transition results in charge state (20011 . . . 1). The empty third dot is helpful for the cascade with pull effect as otherwise transition from the third quantum dot to the first quantum dot would induce errors to the read-out. The change in Coulomb repulsion from the initial transition would pull the electron on the fourth dot to the empty third quantum dot, and so on, resulting in the charge state (2011 . . . 10).

The above-described readout scheme based on the formation of one or more read-out paths that are tuned to provide a cascade of charge transitions in response to an initial charge transition in a spin-to-charge or parity-to-charge conversion system have substantial advantages over existing readout system for 2D quantum dot arrays.

For example, dispersive gate sensing may be used to readout a charge and a spin configuration of quantum dots in the interior of a higher-dimensional array can be readout. However, implementing dispersive gate sensing comes with additional technical requirements, since only on-chip resonators have proven promising for high fidelity readout and such a resonator uses up a lot of space compared to the space needed for a quantum dot. While first results have been demonstrated with dispersive gate sensing it is still far from common in the field. In contrast our method only requires commonly used charge sensors.

Another alternative is to transfer the electron itself by shuttling it through empty dots in the array (similar to CCD charge transport), to bring the electron to a quantum dot near the charge sensor. When using a shuttling technique for readout of dots in the shuttling path the shuttling path cannot host qubits, while with read-out path that is tuned to initiate a cascade of charge transitions between dots in the readout path still be used to host qubits. Further, for the invention only local control of gate voltages is required to perform the read-out while for shuttling many sequential operations are needed and gate voltages on all the gates along the shuttling path have to be adjusted at high frequencies to transfer the electron.

There are several considerations for implementing cascade-based readout. In the cascade where an electron is pushed from an auxiliary dot to a reservoir the auxiliary dot cannot host a qubit. It is convenient to alternatingly empty dots in the cascade path dots, hence half of the dots cannot host qubits. However, as discusses it is possible to fill all sites but one and pull instead of push the electrons, but then it is not sufficient to split the initial pair in order to reset the cascade path as this would result in a latching configuration. Another consideration is that the cascade involves the movement of many electrons, which requires additional time for the readout. However, this additional time can be kept small compared to the required time for the readout itself, as tunnel couplings in the cascade path can be made high. The electrons in the cascade path move between dots, which may induce the spin of electron to change due to the movement, via (artificial) spin-orbit interactions. When these electrons are operated as spin-qubits this may introduce single-qubit errors and overhead to compensate for the systematic effect on the spin. The speed of teleportation does not depend on the distance, making the teleportation-based readout potentially faster than the cascade-based readout, but preparing an entangled pair and separate it over a long distance is a challenging task.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for readout of one or more quantum states in an array of quantum dots, the method comprising:
    configuring at least a first read-out path of at least two connected quantum dots in the array of quantum dots, the configuring including configuring quantum dots in the first read-out path close to a charge transition point such that a charge transition at a first end of the first readout path induces a cascade of charge transitions in the quantum dots of the first readout path, a second end of the first readout path being connected to at least a first charge detector;
    configuring one or more quantum dots in the quantum dot array into a first quantum state-to-charge conversion system, the first quantum state-to-charge conversion system being connected to the first end of the first read-out path, the first quantum state-to-charge conversion system hosting a quantum state;
    applying a read-out signal to the first quantum state-to-charge conversion system, wherein the read-out signal induces a charge transition in the first quantum state-to-charge conversion system depending on the quantum state of the first quantum state-to-charge conversion system; and
    obtaining information about the quantum state of the first quantum state-to-charge conversion system, the obtaining including measuring a sensor signal generated by the first charge detector in response to the read-out signal.

2. The method according to claim 1, wherein the obtaining information about the quantum state of the first quantum state-to-charge conversion system further includes:
    measuring a first state if within a predetermined time period a charge transition is measured in the one or more second quantum dots; or
    determining a second state if within the predetermined time period no charge transition is measured in the one or more second quantum dots.

3. The method according to claim 1, wherein the quantum state is a spin state, the configuring of the spin-to-charge conversion system including:
    configuring the at least two connected quantum dots into a Pauli spin blockade regime.

4. The method according to claim 1, wherein the quantum state is a spin state, and the quantum dot hosting a spin state is connected to a charge reservoir, the configuring of the spin-to-charge conversion system further including:
    configuring the quantum dot hosting a spin state connected to the charge reservoir into an energy selective tunneling regime.

5. The method according to claim 1, wherein at least part of the quantum dots in the first read-out path is configured close to a charge transition point by controlling at least one of the dot parameters.

6. The method according to claim 1, wherein the charge transition in the one or more second quantum dots at the second end of the first readout path includes:
   a charge carrier tunneling from a charge reservoir via a tunnel junction onto one of the one or more second quantum dots at the second end of the first readout path; or
   a charge carrier tunneling from one of the one or more second quantum dots at the second end of the first readout path via a tunnel junction onto a charge reservoir.

7. The method according to claim 1, wherein the configuring of the first readout path further includes:
   tuning quantum dots positioned next to the first readout path in a Coulomb blockade state.

8. The method according to claim 1, wherein the array of quantum dots is a one-dimensional array of quantum dots or a two-dimensional array of quantum dots or a three-dimensional array of quantum dots.

9. The method according to claim 1, wherein the first read-out path of connected quantum dots forms a linear array of quantum dots.

10. The method according to claim 1, further comprising:
    configuring a second read-out path of connected said quantum dots in the array of quantum dots, the configuring of the second read-out path including configuring the quantum dots of the second readout path close to a charge transition point such that a charge transition at a first end of the second readout path induces a cascade of charge transitions in the quantum dots of the second readout path, a second end of the second readout path being connected to the first charge detector or to a second charge detector;
    configuring one or more of the quantum dots in the quantum dot array into a second quantum state-to-charge conversion system, the second quantum state-to-charge conversion system being connected to the first end of the second read-out path, the second quantum state-to-charge charge conversion system hosting a quantum state;
    applying a read-out signal to the second quantum state-to-charge conversion system, wherein the read-out signal induces a charge transition in the second quantum state-to-charge conversion system depending on the quantum state of the second quantum state-to-charge conversion system; and
    obtaining information about the quantum state of the second quantum state-to-charge conversion system, the obtaining including measuring a sensor signal generated by the first charge detector or the second charge detector to which the second quantum state-to-charge conversion system is connected in response to the read-out signal.

11. A controller connectable to an array of quantum dots for readout of one or more quantum states in the array of quantum dots, the controller being configured to:
    configure at least a first read-out path of connected quantum dots in the array of quantum dots, the configuring including configuring quantum dots of the readout path close to a charge transition point such that a charge transition at a first end of the first readout path induces a cascade of charge transitions in the quantum dots of the first readout path, a second end of the first readout path being connected to at least a first charge detector;
    configure one or more quantum dots in the quantum dot array into at least a first quantum state-to-charge conversion system, the first quantum state-to-charge conversion system being connected to the first end of the first read-out path, the first quantum state-to-charge system hosting a quantum state;
    apply a read-out signal to the first quantum state-to-charge conversion system wherein the read-out signal induces a charge transition in the first quantum state-to-charge conversion system depending on the quantum state of the first quantum state-to-charge conversion system; and,
    obtain information about the quantum state, the obtaining including measuring a sensor signal generated by the first charge detector by a charge transition in one or more quantum dots in response to the read-out signal.

12. The controller according to claim 11, wherein the obtaining information about the quantum state of the first quantum state-to-charge conversion system further includes:
    measuring a first state if within a predetermined time period a charge transition is measured in the one or more second quantum dots; and
    determining a second state if within the predetermined time period no charge transition is measured in the one or more second quantum dots.

13. The controller according to claim 11, wherein the quantum state is a spin state, the configuring of the spin-to-charge conversion system including:
    configuring of at least two connected quantum dots into a Pauli spin blockage regime.

14. The controller according to claim 11, wherein the quantum state is a spin state, and the quantum dot hosting a spin state is connected to a charge reservoir, the configuring of the spin-to-charge conversion system further including:
    configuring a quantum dot hosting a spin state connected to a charge reservoir into an energy selective tunneling regime.

15. The controller according to claim 11, wherein the quantum state is a spin state, and the quantum dot hosting a spin state is connected to a charge reservoir, the configuring of the spin-to-charge conversion system further including
    configuring at least part of the quantum dots in the first read-out path close to a charge transition point by controlling at least one of the dot parameters.

16. The controller according to claim 11, wherein the configuring of the first readout path further includes:
    tuning quantum dots positioned next to the first readout path in a Coulomb blockade state.

17. The controller according to claim 11, the controller further being configured to:
    configure a second read-out path of connected said quantum dots in the array of quantum dots, the configuring of the second read-out path including configuring the quantum dots of the second readout path close to a charge transition point such that a charge transition at a first end of the second readout path induces a cascade of charge transitions in the quantum dots of the second readout path, a second end of die second readout path being connected to the first charge detector or to a second charge detector;
    configure one or more of the quantum dots in the quantum dot array into a second quantum state-to-charge conversion system, the second quantum state-to-charge conversion system being connected to the first end of the second read-out path the second quantum state-to-charge conversion system hosting a quantum state;

apply a read-out signal to the second quantum state-to-charge conversion system wherein the read-out signal induces a charge transition in she second quantum state-to-charge conversion system depending on the quantum state of the second quantum state-to-charge conversion system, and obtain information about the quantum state of the second quantum state-to-charge conversion system, the obtaining including measuring a sensor signal generated by the first charge detector or the second charge detector to which the second quantum state-to-charge conversion system is connected in response to the read-out signal.

18. A non-transitory computer-readable storage medium comprising instructions for a computer to control an array of quantum dots for readout of one or more quantum states in the array of quantum dots, wherein the instructions, when executed by the computer, cause the computer to carry out the steps of:

configuring at least a first read-out path of connected quantum dots in the array of quantum dots, the configuring including configuring quantum dots of the readout path close to a charge transition point such that a charge transition at a first end of the first readout path induces a cascade of charge transitions in the quantum dots of the first readout path, a second end of the first readout path being connected to at least a first charge detector;

configuring one or more quantum dots in the quantum dot array into at least a first quantum state-to-charge conversion system, the first quantum state-to-charge conversion system being connected to the first end of the first read-out path, the first quantum state-to-charge system hosting a quantum state;

applying a read-out signal to the first quantum state-to-charge conversion system wherein the read-out signal induces a charge transition in the first quantum state-to-charge conversion system depending on the quantum state of the first quantum state-to-charge conversion system; and obtaining information about the quantum state, the obtaining including measuring a sensor signal generated by the first charge detector by a charge transition in one or more quantum dots in response to the read-out signal.

\* \* \* \* \*